United States Patent [19]

Mergenthaler et al.

[11] Patent Number: 4,775,782
[45] Date of Patent: Oct. 4, 1988

[54] CHECKOUT COUNTER WITH REMOTE KEYBOARD WRITING PAD AND DISPLAY

[75] Inventors: Barry M. Mergenthaler; Donald A. Collins, Jr., both of Cambridge, Ohio

[73] Assignee: NCR Corporation, Dayton, Ohio

[21] Appl. No.: 102,962

[22] Filed: Sep. 30, 1987

[51] Int. Cl.⁴ .............................................. G06C 25/00
[52] U.S. Cl. ...................................... 235/146; 235/6; 235/91 L; 235/98 C; 235/470; 364/478; 364/525; 186/61
[58] Field of Search .................. 235/6, 7, 91 L, 98 C, 235/146, 470; 364/405, 470, 525; 186/56, 57, 59, 61

[56] References Cited

U.S. PATENT DOCUMENTS

| | | |
|---|---|---|
| 1,836,671 | 12/1931 | Langford . |
| 3,076,184 | 1/1963 | Glass . |
| 3,237,198 | 2/1966 | Slutsky ............................ 346/17 |
| 3,251,543 | 5/1966 | Bush et al. ..................... 235/1 R |
| 3,265,298 | 4/1962 | Andersen ........................ 235/23 |
| 3,304,416 | 2/1967 | Wolf . |
| 4,093,865 | 6/1978 | Nickl .......................... 235/470 X |
| 4,138,000 | 2/1979 | Harkup ............................ 186/61 |
| 4,455,100 | 6/1984 | Baner ............................. 400/88 |
| 4,676,343 | 6/1987 | Humble et al. .................. 186/61 |
| 4,679,154 | 7/1987 | Blanford ........................ 364/525 |

Primary Examiner—B. R. Fuller
Attorney, Agent, or Firm—Wilbert Hawk, Jr.; Albert L. Sessler, Jr.; Richard W. Lavin

[57] ABSTRACT

A checkout counter includes an optical scanning system mounted therein and includes a cover member positioned in the top surface of the counter having an aperture through which the scanning system will scan a coded label on the merchandise item positioned adjacent to the aperture. A support member mounted on a rail portion of the checkout counter adjacent the cover member supports a writing pad, a keyboard, a display member and a card reader enabling a customer to conveniently observe the price of the item being scanned, and the amount of money due for the purchased items, when writing a check for the amount due, or when using a credit card or a debit charge to pay for the purchased merchandise items in response to information displayed in the display member.

6 Claims, 3 Drawing Sheets

CHECKOUT COUNTER WITH REMOTE KEYBOARD WRITING PAD AND DISPLAY

BACKGROUND OF THE INVENTION

The present invention pertains to checkout counters and more particularly to a checkout counter constructed to include an optical scanning system for scanning a coded label fixed to a merchandise item.

Present checkout systems include a point of sale terminal device positioned adjacent a checkout counter which includes an optical scanning system for scanning a coded label on a merchandise item positioned adjacent the optical scanning system and for generating signals representing data pertaining to the cost of the purchased item. The price of the purchased item is displayed in either the display portion of the data terminal device or in a remote display member mounted on top of the data terminal device which can be observed by both the customer and the checkout operator. This arrangement has resulted in complaints from customers and other consumer groups that it is hard to correlate the price displayed with the merchandise item being scanned in order to check the accuracy of the checkout operation due to the distance between the scanning area of the checkout counter and the display. It has also been found that one of the events which controls the speed of the checkout operation is the time involved for the customer to write a check to pay for the purchased merchandise item or to use a credit card to pay for such items.

It is therefore a principal object of this invention to provide a checkout counter which includes a combined remote display, a card reader, a keyboard and a writing pad which allows the customer to pay for the purchased merchandise item by means of a check, a credit card or a personal identification debit card, in a highly efficient and speedy manner.

It is a further object of this invention to provide a checkout counter including an optical scanning system with a remote display mounted on the checkout counter to allow the customer to observe simultaneously the merchandise item being scanned and the price of the item on the display.

SUMMARY OF THE INVENTION

In order to fulfill these objects, there is provided a writing pad mounted on a checkout counter which includes an optical scanning system for scanning UPC bar code labels located on a merchandise item positioned adjacent the optical scanning system. The scanning system is located within a portion of the checkout counter which includes a cover having an aperture located therein through which a plurality of scanning beams are projected to read a bar code label attached to a merchandise item being moved past the aperture. Mounted adjacent the aperture on a raised rail member of the checkout counter is a support member which includes a writing surface having a longitudinal dimension which will accommodate a checkbook and a twelve key keyboard positioned at one end of the writing surface to allow a personal identification number to be inserted by the customer as a debit operation for payment of the purchased merchandise items. Extending along the rear edge of writing surface and at an angle to the writing surface is a display member which displays the price of the item being scanned by the optical scanning system and the total price for the purchased merchandise items together with instructions to finalize the merchandising operation. Located adjacent to and behind the display is a slot portion comprising the throat of a magnetic stripe reader enabling a credit card to be checked for identifying the customer and for use in payment of the merchandise items. The display member is positioned adjacent the aperture enabling the customer to simultaneously compare the price of the merchandise item being scanned and the item itself. The display will also allow the customer to observe the total amount due for the purchased items while writing a check on the writing surface adjacent the display which reduces errors in paying for the merchandise items.

The aforementioned and other objects and advantages of the invention will be apparent from the following description of the preferred embodiment of the invention, as illustrated in the accompanying drawings.

DESCRIPTION OF THE PREFERRED EMBODIMENT

Figure 1:
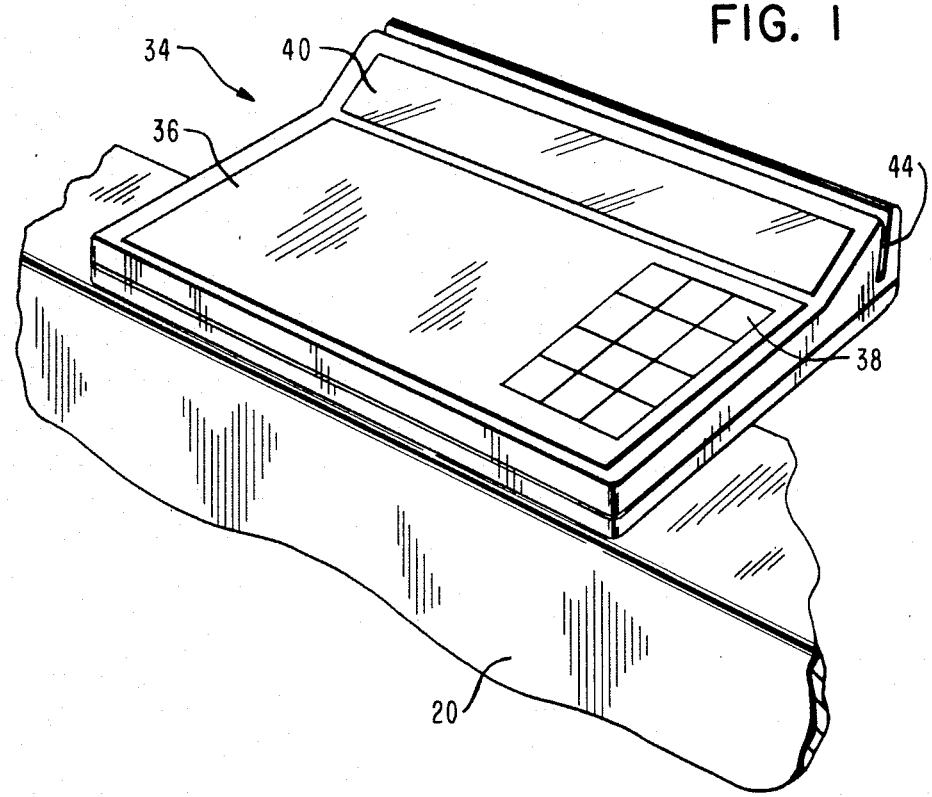
FIG. 1 is a perspective view of a portion of a checkout counter showing the writing pad support structure of the present invention mounted on a rail portion of the checkout counter.
Figure 2:
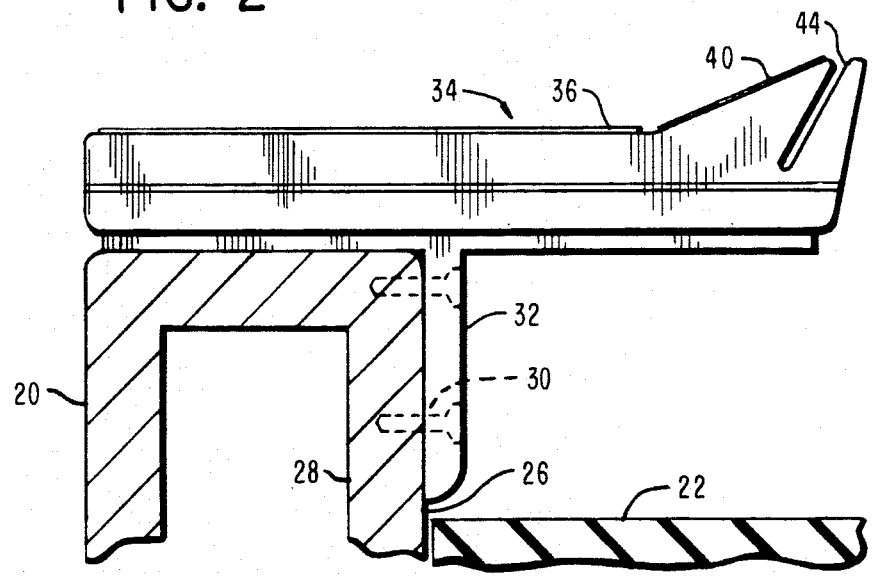
FIG. 2 is a side view of the writing pad structure showing details of its attachment to the rail member of the checkout counter.
Figure 4:
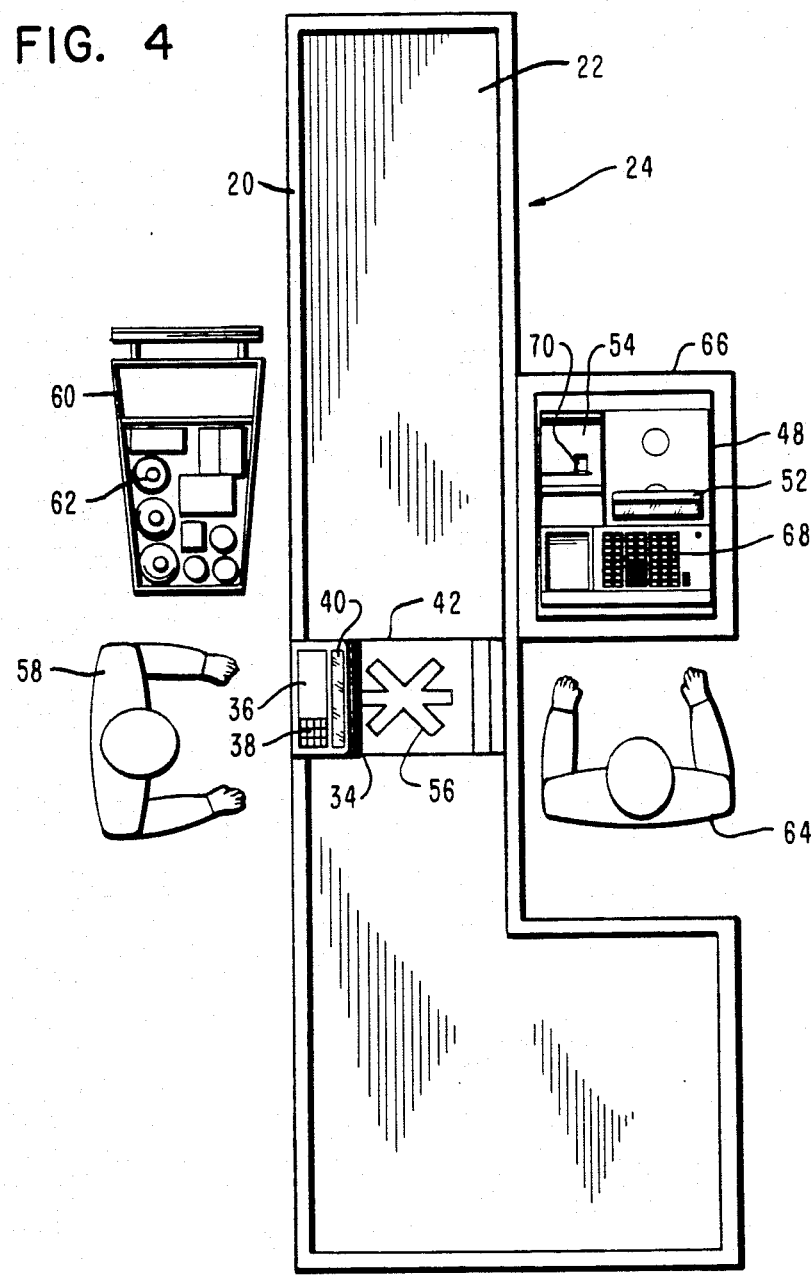
FIG. 4 is a top view of a checkout station showing the location of the writing pad structure with respect to the aperture of the optical scanning system in the checkout counter together with the location of the data terminal device associated with the checkout operation.

Referring now to FIGS. 1, 2 and 4, there is shown a portion of a checkout counter which includes an outer rail member 20 extending a predetermined distance above the top supporting surface 22 (FIG. 2) of the checkout counter generally indicated by the numeral 24 (FIG. 4). Secured to an inner wall 28 (FIG. 2) of the rail member 20 by means of screw members 30 is the depending finger portion 32 of a writing pad support member generally indicated by the numeral 34.

As best seen in FIG. 1, the writing pad support member 34 include a horizontal surface 36, a portion of which comprises a supporting area on which a customer can position a checkbook for writing a check. At the other end of the surface 36 is located a twelve key keyboard member 38 which is used by the customer to enter a personal identification number (PIN) used to debit the customer's bank account as payment for the purchased merchandise items.

Mounted at an angle of 20 degrees to the surface 36 and extending along the rear edge of the surface is a display member 40 which will display the price of the item being scanned by an optical scanner 42 mounted in the checkout counter 24 (FIG. 4). Reference may be made to U.S. Pat. No. 4,093,865 for a complete description of the mounting of a typical bar code scanning system within an enclosed housing such as a checkout counter. The display member 40 will also display the total amount due for the purchased merchandise items and instructions for completing a debit/credit transaction. Extending along the rear edge of the display member 40 is a slot 44 (FIGS. 1 and 2) in which th customer will place and move a credit card through, enabling a magnetic stripe or other type of card reader 46 (FIG. 3) located in the support member 34 to read data identifying the customer in a manner that is well known in the art.

Figure 3:
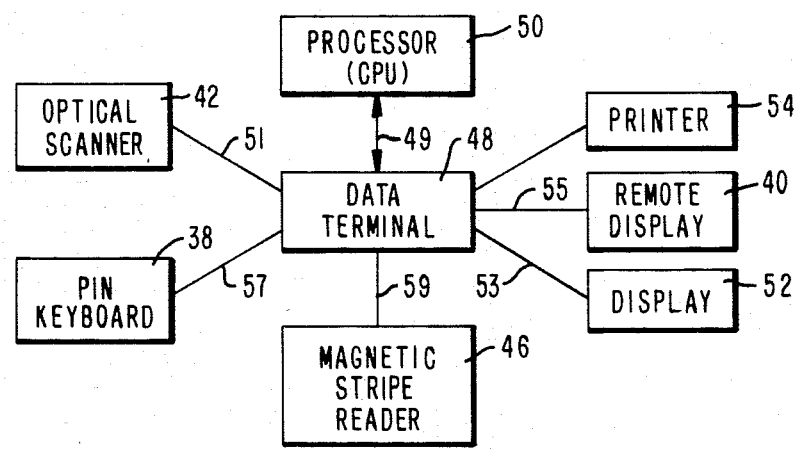
FIG. 3 is a block diagram of the checkout system of the present invention.

Referring to FIG. 3, there is shown a block diagram of the checkout system which includes a data terminal device 48 (FIG. 4) coupled over line 49 to a central processor unit (CPU) 50 remotely located from the data terminal device and in which lookup tables containing the price of the purchased merchandise items are normally stored. Coupled over line 51 to the data terminal device 48 is the optical scanner 42 for generating data from reading a coded label on the merchandise item identifying the merchandise item. This data is transmitted to the data terminal device 48 and then to the processor 50 which in turn uses the received data to obtain the price of the merchandise items scanned from the price tables located therein. This price data is then transmitted back to the data terminal device 48 which outputs over line 53 the price data to a terminal display 52 (FIG. 4) normally located on the terminal device 48 and to the remote display member 40 (FIGS. 1 and 2) over line 55 located on the support member 34. The data terminal device 48 also is coupled over line 57 to the PIN keyboard member 38 (FIG. 1) and over line 59 to the magnetic stripe reader 46 located within the support member 34. The keyboard member 38, the reader 46 and the optical scanner 42 generate data which is used in processing the purchased merchandise item as part of the checkout operation. The data terminal device 48 also includes a printer 54 (FIG. 4) which prints on a receipt record 70 (FIG. 4) and a journal record (not shown) data pertaining to the checkout operation in a manner that is well known in the art.

Referring now to FIG. 4, there is shown a plan view of a checkout station which includes the checkout counter 24 having the rail member 20 extending around the perimeter of the checkout counter and includes the optical scanner 42 and an aperture 56 mounted in the top supporting surface 22 through which scanning light beams from the scanner will scan a coded label on a purched merchandise item as it moves past the aperture 56. Mounted adjacent the scanner 42 is the writing pad support member 34. As part of the checkout operation, the customer 58 will move the shopping cart 60 containing the purchased merchandise items 62 to a position adjacent the optical scanner 42. The customer then positions the purchased merchandise items 62 onto the surface 22 of the checkout counter 24 enabling the checkout operator 64 to move the merchandise items past the aperture 56 as part of a scanning operation in a manner that is well known in the art. Located adjacent the checkout counter 24 is a stand 66 on which is located the data terminal device 48 (FIG. 3) which includes the display 52, the printer 54 and a keyboard 68 for indexing information into the data terminal device which is not available as a result of scanning the purchased merchandise item by the scanner 42. As each item is scanned by the scanner, the price is displayed in the remote display member 40 on the writing pad support member 34 and also on the display 52 mounted on top of the data terminal device 48. The location of the display member 40 with respect to the aperture 56 enables the customer 58 to correlate the type of merchandise item being scanned by the scanner 42 and its corresponding price which is displayed in the display member 40.

At the conclusion of the checkout operation, the amount due for the purchased merchandise items will be displayed in the display members 40 and 52. As a result of displaying the amount due, the customer may either write a check on the writing pad support member 34 for the amount which is displayed in the display member 40 or use a credit card which is inserted in the slot 44 (FIGS. 1 and 2) of the support member 34. This enables the reader 46 (FIG. 4) to read the information identifying the customer and to transmit the information to the terminal device 48 which is then transmitted to the processor 50 for checking the validity of the credit card. If the customer has a bank account which can be debited, the customer, in response to instructions displayed on the display 40, will utilize the twelve key keyboard member 38 on the writing pad support member 34 (FIG. 1) to index the customer's personal identification number which again is transmitted to the data terminal device 48 and then to the processor 50 which processes the data. At the conclusion of the checkout operation, the operator 64 will remove a receipt record 70 (FIG. 4) on which is printed the prices of the purchased merchandise items and the total price of the purchase which is then given to the customer.

It will be seen that there has been described a writing pad arrangement in association with an optical scanning system which provides a display within a customer's field of view that will enable the customer to view both the item being scanned and the price of the item being charged together with a writing surface on which the customer can write on a checkbook the amount due, which amount is also displayed in the remote display located adjacent the writing surface, without looking up at the display on the terminal device. The writing pad also features a magnetic stripe reader and a PIN keyboard which enables the customer to finalize the checkout operation in accordance with instruction displayed on the remote display in a highly efficient manner.

While the principles of the invention have now been made clear in an illustrated embodiment, it will be obvious to those skilled in the art that many modifications of structure, arrangements, elements and components can be made which are particularly adapted for specific environments and operating requirements without departing from these principles.

We claim:

1. A checkout system comprising:
    a checkout counter having a supporting surface for supporting purchased merchandise items;
    an aperture in said supporting surface;
    an optical scanner mounted in the checkout counter adjacent the aperture for projecting scanning light beams through the aperture for reading coded labels on a merchandise item positioned adjacent the aperture;
    a support member mounted on a front edge of the checkout counter adjacent the aperture and having an elongated horizontal surface for supporting a checkbook or the like; and
    a display means extending along a rear edge of the horizontal surface and inclined at an acute angle to said horizontal surface for displaying data pertaining to a purchase price of the merchandise items beng scanned and an amount due for the purchased merchandise items enabling a customer to view the amount due while writing a check on the horizontal surface of the support member.

2. The checkout system of claim 1 in which said display means displays instructions to complete the purchase of the merchandise items and said support member further includes a keyboard member mounted on a portion of the horizontal surface adjacent the display means enabling the customer to enter identifying data into the keyboard member in accordance with the instructions displayed on the display means.

3. The checkout system of claim 1 in which said support member further includes a horizontal slot extending along one edge of the support member adjacent the rear of the display means and a card reader mounted within the support member adjacent the horizontal slot for reading a data card member moved through the slot, the card member containing data identifying the customer as part of a debit/credit transaction.

4. The checkout system of claim 1 in which said acute angle is 20 degrees.

5. The checkout system of claim 1 in which said checkout counter includes an upstanding rail member extending along a peripheral edge of the checkout counter and said support member includes a depending arm portion secured to an inside edge of the rail member for locating the support member on a top surface of the rail member adjacent the aperture in a top surface of the checkout counter.

6. In combination with a checkout counter having a top supporting surface enclosed by a side rail member extending along a peripheral edge of the supporting surface, said supporting surface supporting merchandise items purchased by a customer:

a support member secured to said rail member and having a flat horizontal supporting surface for supporting a checkbook or the like;

a keyboard located on a portion of said horizontal supporting surface;

a display member mounted on said horizontal supporting surface and extending along a rear edge of said horizontal surface, said display member having an inclined display surface orientated at an acute angle to a plane parallel to the horizontal support surface of the support member;

a horizontally extending slot located adjacent the rear edge of the display member;

a card reader located within said support member adjacent the slot for reading a data card moved along said slot; and processing means connected to said display member and said card reader for generating data representing a purchase price of the merchandise items purchased by the customer whereby the processing means will display an amount due for the purchased merchandise items in the display member enabling the customer to finalize the purchase of the items utilizing the horizontal surface to write a check or display instructions for the customer to use the keyboard and the card reader to provide a debit/credit transaction as payment for the purchased merchandise items.

* * * * *

UNITED STATES PATENT AND TRADEMARK OFFICE
CERTIFICATE OF CORRECTION

PATENT NO. : 4,775,782

DATED : October 4, 1988

INVENTOR(S) : Barry M. Mergenthaler et al.

It is certified that error appears in the above-identified patent and that said Letters Patent is hereby corrected as shown below:

Column 4, line 65, delete "beng" and substitute --being--.

Signed and Sealed this

Twenty-eighth Day of February, 1989

Attest:

DONALD J. QUIGG

Attesting Officer      Commissioner of Patents and Trademarks